INVENTOR
W. B. MIMS
ATTORNEY

INVENTOR
W. B. MIMS
ATTORNEY 3,265,961
SPIN ECHO APPARATUS
William B. Mims, New York, N.Y., assignor to Bell Telephone Laboratories, Incorporated, New York, N.Y., a corporation of New York
Filed June 25, 1962, Ser. No. 204,708
5 Claims. (Cl. 324—.5)

This invention relates to spin echo apparatus. More particularly, it relates to spin echo apparatus for changing the shape or duration of radio frequency pulses.

In electronic systems employing pulsed radio frequency wave energy it is frequently desirable to transform pulses having an envelope of one shape into pulses having envelopes of different but functionally related shapes. Pulse transmission systems utilizing this technique are disclosed in U.S. Patent 2,678,997 to S. Darlington. A specific application of the technique to "chirp radar" is discussed in detail in an article by J. Klauder et al. in The Bell System Technical Journal, July 1960. Typically, prior apparatus for transforming the shape of pulse envelopes has utilized passive dispersive networks such as, for example, delay lines. The characteristics of such networks are generally fixed or variable only within certain specified limits. Thus, while capable of performing repetitive transformations on the separate pulses of a pulse group or train, prior apparatus has not been specifically adapted to high speed variation such as might be desired, for instance, in systems in which information is transmitted as a code impressed on the envelopes of radio frequency pulses.

An object of this invention is the transformation of radio frequency pulse envelopes of one shape into pulses of a different shape functionally related to the first pulse.

It is also an object of the invention to code and decode the frequency components of modulated radio frequency pulses.

These and other objects of the invention are achieved in one illustrative embodiment thereof comprising a gyromagnetic medium positioned in an inhomogeneous magnetic field. The inhomogeneous magnetic field differentially polarizes groups of gyromagnetic elements in the medium so that the various groups display resonant characteristics extending over a relatively broad frequency band. A first radio frequency pulse applied to the medium causes precession of selected spin groups therein. Slight differences in the precession frequencies of the spins in each group result in phase divergence of the rotating magnetic moments. Due to the differential angular velocities of the gyromagnetic elements, the moments are soon distributed about the axis of precession. A subsequent pulse reverses the angular positions of the moments relative to one another, establishing phase convergent precession. After an interval, the precessing moments return to coincidence and produce echoes from the medium. By proper control of the echo inducing pulse, the echoes can be distributed in time according to a specified function. Thus an output may be obtained which is functionally related to the input, the nature of the relation being determinable by the echo inducing pulse. Alternatively, the echoes may be caused to coincide, thereby producing a pulse of relatively high power.

It is well known that the atomic nuclei of chemical substances spin with characteristic frequencies about their own central axes. As each nucleus has mass, it also has an angular momentum associated with the spin and may, in fact, be considered as an infinitesimal gyroscope. In addition, the nucleus is characterized by a magnetic moment directed along its gyroscopic axis. It is also known that the electrons surrounding an atomic nucleus possess angular momentum and magnetic moments due to their masses, charges and spins. It is convenient to refer to bodies possessing a magnetic moment and angular momentum as gyromagnetic. The ratio between these two quantities is defined as $\gamma$, the gyromagnetic radio.

When an ensemble of gyromagnetic bodies is subjected to a unidirectional magnetic field, the magnetic moments tend to orient in a direction parallel to the field. Gyromagnetic bodies having their magnetic moments out of alignment with the field are subjected to a force couple which causes them to precess about the field direction. The frequency of precession, known as the Larmor frequency, is given by $\omega_0 = \gamma H_0$ where $H_0$ is the field acting on the body. By applying to the ensemble a radio frequency magnetic field having a component orthogonal to the unidirectional polarizing field, the gyromagnetic bodies may be tipped out of alignment therewith and caused to precess at their characteristic Larmor frequency. Precession continues after the cessation of the radio frequency field until it is damped out by other influences characterized, in general, as relaxation processes.

When a gyromagnetic medium is polarized by an inhomogeneous magnetic field the Larmor precession frequencies of the individual gyromagnetic bodies are distributed over a range of frequencies. As a result, when all the spins in the ensemble are tipped out of alignment with the polarizing field by a single radio frequency pulse, they will begin to precess in phase with each other, but due to the differing Larmor frequencies their initial phase coherence is quickly destroyed and is replaced by rotational phase incoherence. In accordance with spin echo techniques, the initial coherence is recovered by reversing the relative angular motions of the magnetic moments from phase divergence to phase convergence. This is accomplished, for example, by a second radio frequency pulse applied to the gyromagnetic medium which, in terms of a coordinate system rotating at the Larmor frequency, tips the precessing magnetic moments through an angle of 180 degrees about the direction of the radio-frequency fields, thereby effectively reversing their angular sequence. Magnetic moments precessing at greater angular velocities are moved from their positions ahead of the others to positions behind, from which they proceed to overtake those with lesser angular motions. After an interval equal to that between the first and second pulses, the precessing gyromagnetic bodies return to their initial condition of phase coherence which can be detected by the collective inductive effect of the rotating magnetic moments.

An ensemble of gyromagnetic bodies, comprising a gyromagnetic medium, is typically characterized by a resonance line or band having a finite width which encompasses the Larmor frequencies of substantially all the bodies included therein. In the case of nuclei, for example, the resonance linewidth is due primarily to variations in the magnetic fields acting on the individual bodies. Such variations may be the result of inhomogeneities in an applied polarizing field, of interactions between the magnetic moments of the bodies themselves, or of irregularities in the crystalline electric fields. In spin echo apparatus in which the magnitude of the output or echo pulse is of primary importance, precession is advantageously induced by pulses of sufficient intensity to turn all the spins in the resonance line by the same angle, which angle is appropriate to the generation of a spin echo. This requires that the radio frequency field intensity is greater than the width of the line as measured in units of magnetic field. Thus the number of spins which converge to produce an echo is maximized.

It is a feature of the invention that precession is induced in gyromagnetic media by pulses which at any instant induce precession in only a narrow segment of the resonance bandwidth of the gyromagnetic medium. Each segment nevertheless includes sufficient spins to produce echo signals.

It is a further feature of the invention that precession among selected spin groups in gyromagnetic media is induced by modulating the frequency of the precession inducing pulse over the resonance bandwidth.

The above mentioned as well as other objects and features of the invention will be fully understood from the following more detailed discussion taken in conjunction with the accompanying drawing in which.

Figure 1:
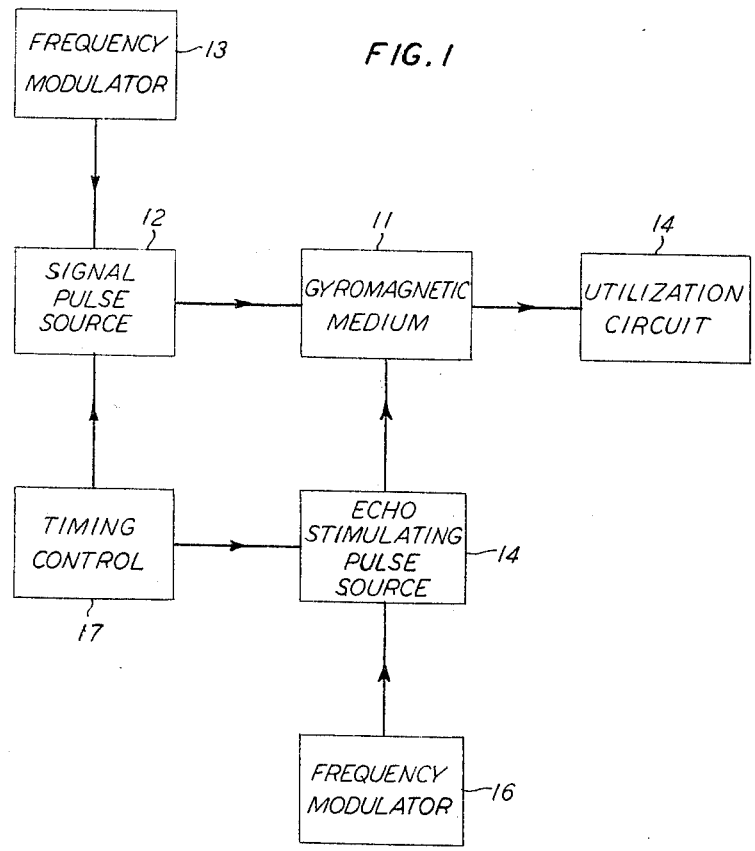
FIG. 1 is a block schematic drawing of pulse translating apparatus embodying the invention.

Turning now to FIG. 1, there is shown in block schematic form spin echo pulse translating apparatus illustrative of the principles of the invention, comprising a gyromagnetic medium 11 which includes gyromagnetic elements having Larmor precession frequencies extending over a relatively broad range. A signal pulse source 12 is coupled to the medium 11 for applying thereto wave energy pulses having frequencies within the Larmor frequency range. In accordance with the invention, pulses supplied by the signal source 12 are adapted to induce precession at any instant in a relatively narrow portion of the resonance line. The width of the affected portion of the line is dependent primarily upon the intensity of the pulse. The frequency of the signal pulses is controlled in the embodiment of FIG. 1 by a frequency modulator 13. Also coupled to the medium 11 is an echo stimulating pulse source 14 for applying thereto monochromatic wave energy pulses having frequencies which may be varied over the Larmor frequency range by a frequency modulator 16. The pulse sources 12 and 14 are gated on and off by a timing control 17. Wave energy pulses generated by spin echoes from the medium 11 are directed to a utilization circuit 18.

The gyromagnetic medium 11 includes gyromagnetic elements having Larmor precession frequencies extending over a relatively broad frequency range. The gyromagnetic elements may be, for example, atomic nuclei of chemical substances or electrons in orbits around such nuclei. Differential Larmor frequencies may be established in an ensemble of similar gyromagnetic elements by locating it in an inhomogeneous magnetic field. Inhomogeneities normally present in the fields generated by ordinary magnetic apparatus are sufficient to produce a useful broadening of the gyromagnetic resonance line in many substances of interest. Another factor contributing to the differential polarization of gyromagnetic elements in a medium is the disorder inherent in atomic or molecular interaction. Irregularities in crystals even those of good quality, result in significant variations of the Larmor frequencies of gyromagnetic elements throughout the lattice.

In a preferred form of the invention the medium 11 comprises a crystalline paramagnetic substance, such as silicon doped with phosphorous, and the gyromagnetic elements are electrons. Because electrons are characterized by larger gyromagnetic ratios than are atomic nuclei, their Larmor precession frequencies are proportionally higher in a magnetic field of given intensity. Conversely, if it is desired to produce spin echoes of a given frequency, the magnetic field required is less in the case of electrons than it is for nuclei. Electron spin echoes are readily produced in the microwave frequency range whereas nuclei would require magnetic fields of prohibitive intensity to produce echoes at such high frequencies. The energy returned by electron spin echoes is generally a larger part of the signal energy than is obtained from nuclear spin echoes. That is, the efficiency of the process is higher. In addition, electron spin echo signals may be produced with very low noise temperatures. These characteristics are of considerable interest in practical pulse transmission apparatus employing the invention, such as chirp radar systems.

The resonant band of the gyromagnetic medium 11 may conveniently be thought of as a continuum divided into a plurality of infinitesimal cells each of which corresponds to a distinct Larmor frequency. Signal pulses supplied by the source 12 contain frequencies corresponding to particular cells or frequencies within the resonance line. By applying signal pulses to the medium 11 at the proper frequency and power level, gyromagnetic elements within any particular cell may be tipped out of alignment with the magnetic biasing field and caused to precess at their characteristic Larmor frequency. Although the elements in the cell begin to precess at the same time, minute irregularities inevitably produce slight variations in their precession frequencies. As a result, the precessing elements quickly diverge from phase coherence and their magnetic moments become randomly distributed about the axis of precession. The initial order in the array of elements is not lost, however, but can be recovered by applying to the medium 11, within the relaxation time, a second wave energy pulse. The second pulse, supplied by the echo stimulating source 14, also contain frequencies corresponding to the Larmor frequencies of elements in the various cells. The echo stimulating pulse reverses the rotational phase relation of the gyromagnetic elements so that those of higher frequency are removed from a leading to a lagging position, while the lagging elements of lower frequency assume the lead. Thus the precessing moments eventually return to a condition of phase coherence due to the overtaking of the slower elements by the faster. The collective effect of the rotating magnetic moments at phase coincidence induces an echo pulse of Larmor frequency wave energy in a coil or cavity which couples the medium 11 to the utilization circuit 18. For any particular cell, the time interval between the echo stimulating pulse and the echo is equal to that between the signal pulse and the echo stimulating pulse.

Heretofore it has been the practice in spin echo apparatus to apply to the gyromagnetic medium pulses having intensities and durations adapted to induce precession of elements having Larmor frequencies extending over a range considerably in excess of the resonance linewidth. All the spins in the line are thus simultaneously tipped out of alignment with the polarizing magnetic field; all begin to precess at the same instant; the rotational phase relations of all are reversed at the same time; and all converge to produce the echo pulse. In accordance with the invention, however, the signal pulses and echo stimulating pulses act at any instant on a relatively small group of spins in the resonance line, corresponding to the conceptual cells described above. Thus, phase divergent spin precession may be induced in selected groups of gyromagnetic elements having particular Larmor frequencies by controlling the frequency of the signal pulses.

Similarly, by controlling the frequency of the echo stimulating pulses a selection may be made of the spin groups within which the rotational phase relations shall be reversed. When the signal pulse is a function of time, precession is sequentially induced in selected groups of gyromagnetic elements. If the echo stimulating pulse is varied over the same range of frequencies as the precession inducing pulse, the same spin groups will undergo reversal of their internal phase relations and will contribute frequency components to the echo. The time at which each frequency component appears in the echo is determined by the times at which the corresponding spin groups was excited by the presence of the appropriate frequency in the signal and echo stimulating pulse. The echo stimulating pulse may thus be considered as an operator which translates a signal pulse having a certain shape into a pulse having a different but functionally related shape.

In some applications of the invention it is desirable to compress a pulse of relatively long duration into as short an interval as possible. For example, a radar system may send out pulses which are extended in time in order to avoid peak power limitations while maximizing the energy returned by reflection from a target. As an antijamming measure, the radar pulses may be frequency modulated in accordance with a secret code. The invention may be advantageously employed at the receiver to convert the frequency modulated reflection pulses into sharply defined pulses adapted for optimum operating conditions of the display apparatus.

Figure 2:
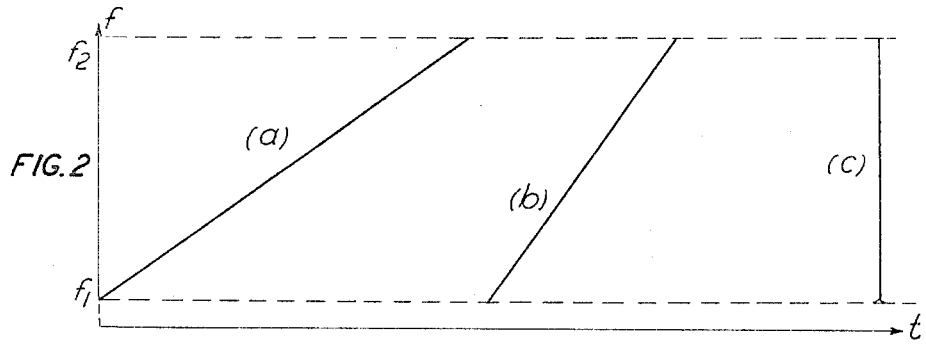
FIGS. 2, 3, 4 and 5 illustrate the shape of radio frequency pulses employed in and produced by the invention.

Compression of frequency modulated signal pulses may be understood by referring to FIG. 2. The signal pulse (a) is frequency swept across the resonance line of the gyromagnetic medium so that the frequency is a linear function of the time $t$. As the pulse frequency crosses the frequencies of the various cells in the medium, groups of gyromagnetic elements begin to precess with their characteristic Larmor frequencies. To reverse the precession phase relations of the spins within the cells, a subsequent echo stimulating pulse (b) is swept across the resonance line in one-half the time of the first pulse. As a result, the echoes from all of the cells in the line coincide in time, thereby producing a single sharp pulse (c) of relatively high amplitude.

Figure 3:
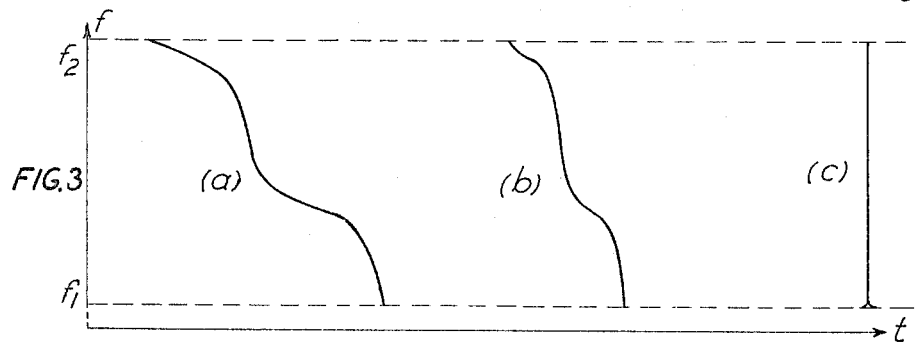
Figure 4:
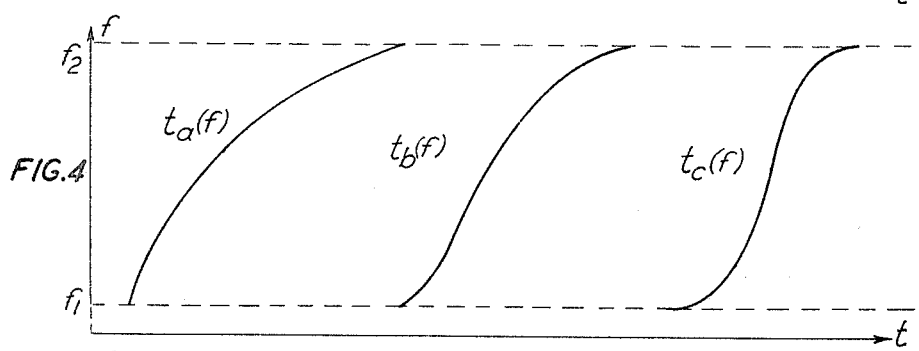

The invention is not limited to compressing linearly swept pulses. As is illustrated in FIG. 3, a pulse (a) of arbitrary shape may be maximally compressed by operation of an echo stimulating pulse (b) of similar shape but shorter duration. In general, echoes from substantially all cells in the resonance line will coincide at a time $T_c$ when $$2t_b(f) - t_a(f) = T_c \qquad (1)$$

where $t_b(f)$ and $t_a(f)$ represent the times when the frequency swept pulses (a) and (b) cross the frequency $f$ in the line. Furthermore, echoes from all spin groups in the resonance band need not coincide but may instead be distributed in time according to some desired function. This point is illustrated in FIG. 4, in which a frequency modulated signal pulse $t_a(f)$ is transformed by operation of an echo stimplating pulse $t_b(f)$ into a different but functionally related echo pulse $t_c(f)$. The relation between the three pulses is that of Equation 1 above.

Figure 5:
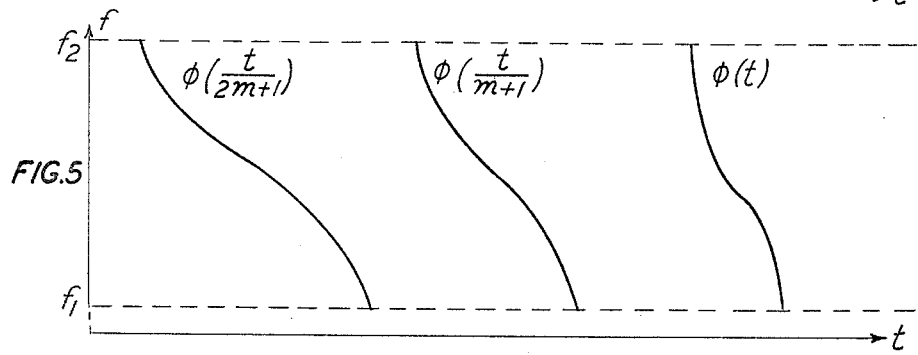

Another translation which is of interest is illustrated in FIG. 5. A signal pulse having a frequency described by a function $$\varphi\left(\frac{t}{2m+1}\right)$$

may be altered in scale or duration by operation of an echo stimulating pulse whose frequency is given by the function $$\varphi\left(\frac{t}{m+1}\right)$$

The sequence of echoes from the convergence of precessing spins in the various cells of the resonance line is given by $\varphi(t)$.

Figure 6:
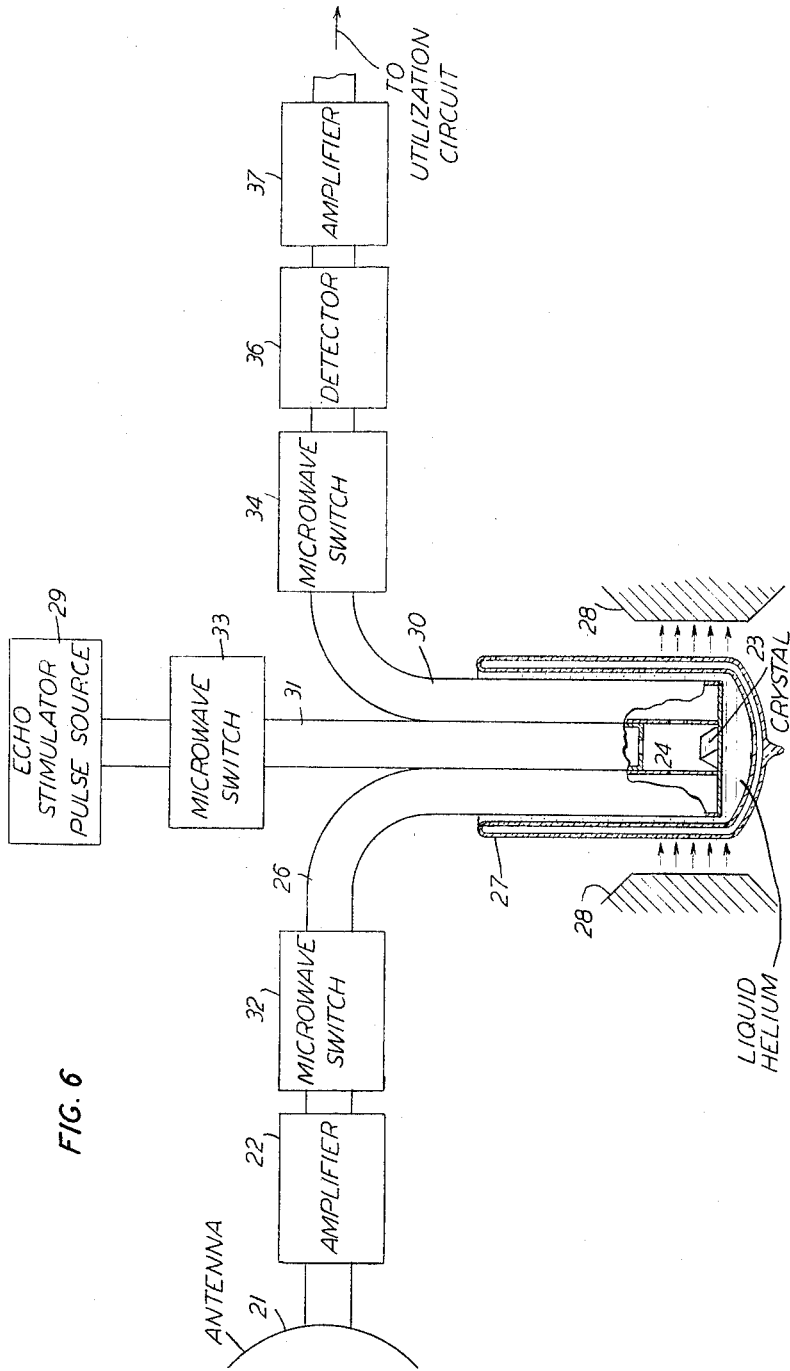
FIG. 6 depicts in schematic form the receiving portion of a pulse transmission system embodying the invention.

There is shown in FIG. 6 a schematic representation of the receiving portion of a pulse transmission system utilizing the invention. Frequency coded wave energy pulses transmitted from a distant station or reflected from a distant traget are received by an antenna 21 and amplified by an amplifier 22 before being applied to a gyromagnetic medium 23 positioned in a resonant cavity 24. The amplifier 22 is coupled by a waveguide 26 to cavity 24 which in the illustrated embodiment is housed in a dewar 27 filled with liquid helium to maintain the medium 23 at cryogenic temperatures. The gyromagnetic elements of the medium 23 are differentially polarized by inhomogeneities of a magnetic field established between magnetic pole pieces 28. Wave energy pulses received by the antenna 21 correspond to the signal pulses referred to in the above more general description. Similarly, echo stimulating pulses are applied to the medium 23 by a source 29 which may comprise, for example, a voltage controlled backward wave oscillator. The source 29 is coupled by waveguide 31 to cavity 24. Waveguide 30 couples the cavity 24 through a detector 36 and amplifier 37 to a utilization circuit not shown. In arrangements of the type illustrated it is desirable to isolate the cavity 24 from the echo stimulating source 29 as well as from the utilization circuit during the signal pulse. In like manner, the cavity 24 is advantageously isolated from the antenna 21 and from the utilization circuit during the echo stimulating pulse from source 29. During the echo pulse, the antenna 21 and the source 29 are preferably isolated from the cavity 24. The above described mode of operation is achieved in the illustrative embodiment by operation of microwave switches 32, 33 and 34 which may be, for example, biased diodes or ferrite switches.

A pulse which is not swept in frequency may have an intensity such that, when applied to a gyromagnetic medium, it induces precession over a relatively small range of frequencies. At such a power level, characterized by a radio frequency magnetic field H, in the medium, a 180 degree pulse requires a time $\pi/\gamma H_1$. A similar condition is imposed on the rate at which the frequency must be swept across the resonance line in the invention. More particularly, if the half-width of a spin group is $H_1$, the sweep rate $\delta f/\delta t$ of the echo stimulating pulse is preferably of the order of $$\left(\frac{\gamma H_1}{\pi}\right)^2$$

In qualitative terms, this means that the frequency modulated pulse should move away from a spin group when the magnetic moments have been tipped through an angle of 180 degrees.

Spin echoes have been produced in accordance with the invention by applying microwave pulses in the kilomegacycle range to a gyromagnetic medium comprising calcium tungstate doped with trivalent cerium ions to a concentration of $3.3 \times 10^{17}$ ions/cc. Relaxation processes in this material at liquid helium temperatures are slow enough to permit the observation of echoes for more than 100 microseconds after a signal pulse. Use of the entire paramagnetic resonance line of this material (about 18 megacycles) permits pulses to be compressed through spin echo techniques to pulses in the $10^{-7}$ sec. to $10^{-8}$ sec. range. Echoes have also been produced in silicon doped with phosphorous to a concentration of $10^{17}$ ions/cc.

Although the invention has been described with particular reference to a specific embodiment, this is for purposes of illustration only and is not intended to limit the scope of the invention. Many modifications and variations of the invention are possible and may be made by those skilled in the art without departing from the principles disclosed herein. For instance, the nature of the signal and operator pulses may be varied to achieve many special effects advantageous in particular applications. Moreover, the invention may be practiced by varying other parameters or combinations thereof in a manner fully equivalent to the operation described above. Many gyromagnetic materials may also be used.

What is claimed is:
1. Pulse translating apparatus comprising a gyromagnetic medium,
    means for differentially polarizing gyromagnetic elements in said medium to establish differential Larmor precession frequencies therein,
    means for applying frequency modulated signal pulses to said medium for sequentially inducing phase divergent spin precession in groups of said elements having particular Larmor frequencies, means for applying frequency modulated pulses to said medium for sequentially reversing the precessional phase relations to phase convergence in groups of said precessing elements having particular Larmor frequencies, and means for detecting spin echo signals induced by the convergence of magnetic moments of elements in each of said groups.

2. Pulse translating apparatus comprising a gyromagnetic medium, means for differentially polarizing gyromagnetic elements in said medium to establish differential Larmor precession frequencies extending over a predetermined frequency range, means for applying signal pulses to said medium for inducing phase divergent spin precession of gyromagnetic elements therein, means for applying operator pulses to said medium for reversing the precessional phase relations of said elements to phase convergence, said signal and operator pulses having frequencies within said range and being adapted at any instant to affect elements in a relatively narrow portion of said frequency range, means for modulating the frequency of said signal and operator pulses over said frequency range, and means for detecting for utilization spin echo pulses induced by the convergence of said elements.

3. Pulse translating apparatus as claimed in claim 2 wherein the frequency modulation of said signal pulses is described by a function $$\varphi\left(\frac{t}{2m+1}\right)$$

and the frequency modulation of said operator pulses is described by the similar function $$\varphi\left(\frac{t}{m+1}\right)$$

in which $m$ is a constant and $t$ represents time, whereby the frequency of said echo pulses is described by the function $\varphi(t)$.

4. Pulse translating apparatus as claimed in claim 2 wherein the relations between time and frequency in said signal, operator and echo pulses are given by $t=t_a(f)$, $t=t_b(f)$ and $t=t_c(f)$, respectively, and $$t_b(f) = \tfrac{1}{2}[t_a(f) + t_c(f)]$$

5. Pulse translating apparatus as in claim 2 wherein said gyromagnetic medium comprises a paramagnetic material and said gyromagnetic elements are electrons.

References Cited by the Examiner

UNITED STATES PATENTS

| 2,832,061 | 4/1958 | Garwin et al. | 324—0.5 |
| 2,887,673 | 5/1959 | Hahn | 324—.5 X |

OTHER REFERENCES

Gordon et al.: Physical Review Letters, vol. 1, No. 10, Nov. 15, 1958, pp. 368–370.

Wanlass et al.: Physical Review Letters, vol. 6, No. 6, Mar. 15, 1961, pp. 271–273.

The International Dictionary of Physics and Electronics, 2d edition, 1961, D. Van Nostrand Co., Inc., Princeton, p. 1076.

CHESTER L. JUSTUS, *Primary Examiner.*

DAVID G. REDINBAUGH, *Examiner.*

MAYNARD R. WILBUR, R. F. ROTELLA,
*Assistant Examiners.*